April 17, 1945.  A. M. MOEN  2,373,702
FAUCET
Filed Aug. 14, 1943  2 Sheets-Sheet 1
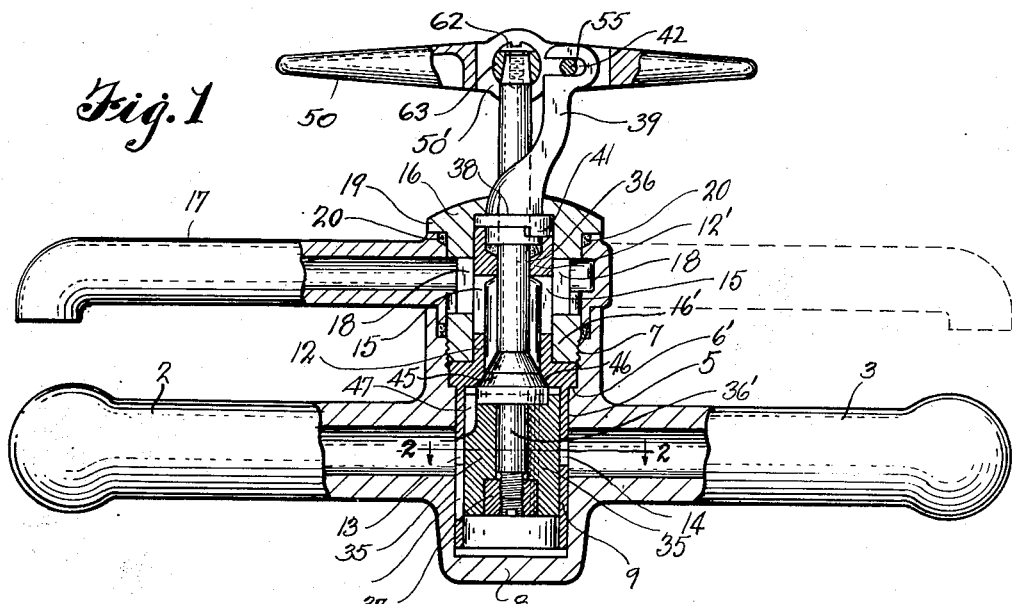
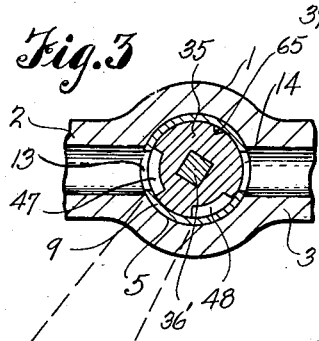
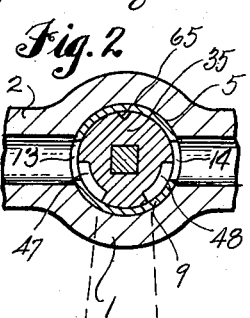
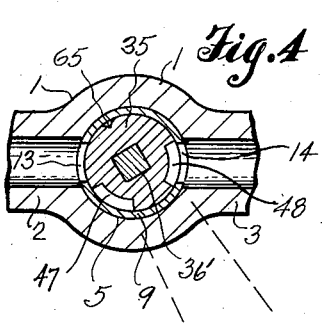
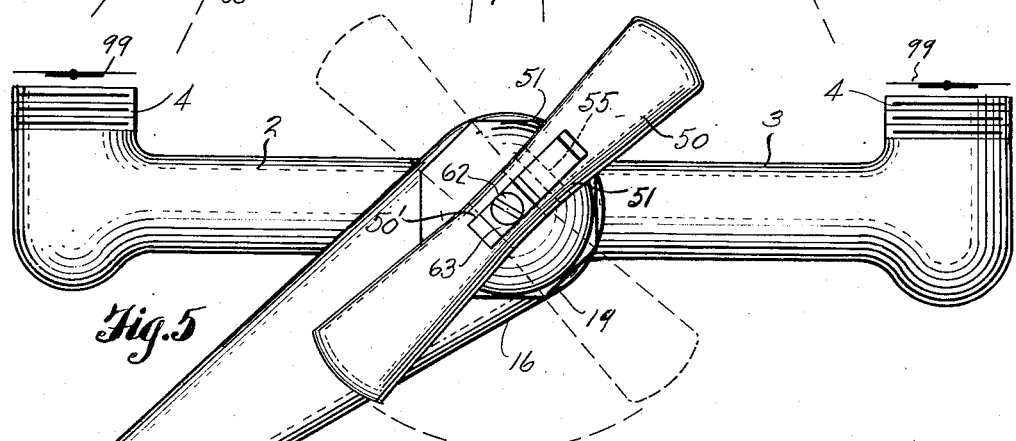
INVENTOR
ALFRED M. MOEN
BY
Cook & Robinson
ATTORNEY

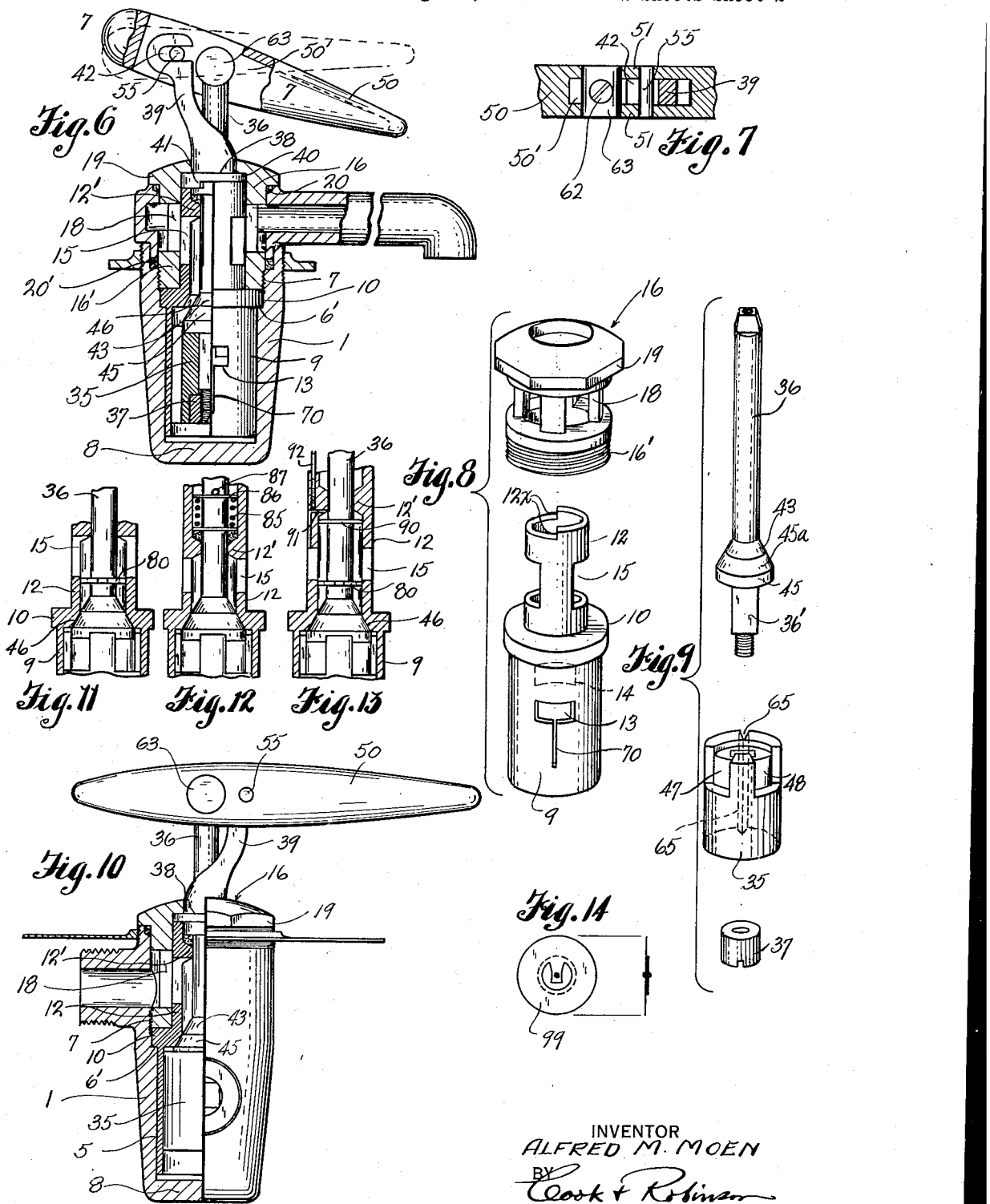

Patented Apr. 17, 1945

2,373,702

UNITED STATES PATENT OFFICE 2,373,702

FAUCET

Alfred M. Moen, Seattle, Wash.

Application August 14, 1943, Serial No. 498,625

14 Claims. (Cl. 277—11)

This invention relates to faucets, and it has reference more particularly to what are known as "mixing faucets"; this application being a continuation in part of my application filed on August 4, 1941 under Serial No. 405,349.

It is the principal object of this invention to provide an improved type of mixing faucet of simple, practical and durable construction, whereby hot and cold water may be mixed in any proportionate amounts, ranging from all cold water to all hot water, and delivered in the desired proportionate amounts from the minimum up to the maximum flow possible through the faucet.

More specifically stated, the objects of the present invention reside in the provision of a mixing faucet that is especially adapted for use in connection with the hot and cold water supply lines such as are generally provided for use in kitchens, laundries and lavatories of homes, and which is characterized by its having a single control member for the determination of mixture and also the amount of flow. Furthermore, a faucet wherein the control member comprises a pivoted handle lever adapted for swinging adjustment through a definite horizontal arc to the opposite limits thereof, respectively, to obtain settings for all cold and all hot water, and to an infinite number of intermediate positions for obtaining any proportionate mixing of cold and hot water desired, and which by its vertical tilting to different degrees will determine and control the amount of flow of the desired mixtures.

Still another object of this invention resides in the provision of a faucet of the kind above stated that is free of springs and all those parts that usually give trouble due to wear or looseness that is incident to use.

Other objects of the invention reside in the details of construction and in the combination of parts employed, and the mode of operation of the device as will hereinafter be fully described.

In accomplishing these and other objects of the invention, I have provided the improved details of construction, the preferred forms of which are illustrated in the accompanying drawings wherein—

Fig. 1 is an elevation of a mixing faucet embodied by the present invention; parts of the spout, handle and the valve housing being broken away for better disclosure.

Fig. 2 is a horizontal section, on line 2—2 in Fig. 1, showing the position of adjustment of the rotary control valve, relative to the hot and cold water inlets, for obtaining a mixture of substantially equal amounts of hot and cold water.

Figs. 3 and 4 are views similar to that of Fig. 2, showing, respectively, the position of the rotary valve for obtaining all hot water and all cold water.

Fig. 5 is a top view of the present mixing faucet.

Fig. 6 is a vertical section taken transversely through and axially of the valve housing and showing the valve in open position.

Fig. 7 is a sectional detail taken on line 7—7 of Fig. 6.

Fig. 8 is a view showing, in perspective, the valve bushing and the packing plug on which the swing spout is mounted.

Fig. 9 is a perspective view of the valve piston, its stem and holding nut in disassembled relationship.

Fig. 10 is a side view, partly in vertical section of a faucet of a modified form.

Figs. 11, 12 and 13, respectively, disclose details of alternative forms of valve closure means.

Fig. 14 shows in side view, and in edge view, a back check valve used in the connecting lines.

Referring more in detail to the drawings—

First, with respect to the mixing faucet as seen in Fig 1: It will be explained that this faucet construction comprises a valve housing 1 from which integral pipes 2 and 3 extend horizontally and laterally from opposite sides. These pipes are equipped at their outer ends with threaded portions 4 to facilitate their connection, respectively, with hot and cold water supply lines, not herein shown. For convenience in this description, the pipe 2 is considered to be the hot water connection, and the pipe 3 is considered to be the cold water connection.

Formed vertically in the housing 1, and entering from the top side thereof is a cylindrical bore 5 of substantial depth and extending below the level of the channels of the pipes 2 and 3. At its upper end, the bore 5 is formed with a counterbore 6 of increased diameter, forming an upwardly facing shoulder 6', and this counterbore is interiorly threaded as at 7.

The lower end of the bore 5 is closed, as noted in Figs. 1 and 6, by the housing wall 8, and fitted in the cylindrical bore 5 is a cylindrical sleeve bushing 9, open at its lower end and formed about its upper end portion with an encircling shoulder or flange 10 that is seated against the shoulder 6' of the counterbore 6. Extending upwardly beyond the shoulder 10, coaxially of the lower portion of the sleeve bushing, is a tubular extension in the form of a tubular stem 12, of a diameter substantially reduced below that of the flange 10. At its lower end, this tubular stem opens directly into the interior of the hollow bushing 9, and at its upper end is open and has its top edge stepped down at one side of the diametric line forming the shoulders 12x shown best in Fig. 8. Near its upper end, the part 12 has a restriction 12' in which the valve stem, later described, is fitted for movement.

The sleeve bushing 9 is formed in apposite side walls with horizontal slots or ports 13 and 14 which register respectively with the channels of pipes 2 and 3 for the inflow of water from the hot and cold water supply lines, and formed in the bushing stem portion 12 are ports or passages 15 for the outflow of the water, when the valve is open, to a swing spout 17.

The spout 17 extends horizontally, and at its inner end has a vertical opening whereby it is fitted about a packing plug that is designated in its entirety by reference numeral 16 and is shown best in Fig. 8. This plug has a threaded lower end portion 16' that is threaded into the counterbore 6 of the housing and it seats against the flange 10 of the bushing. The plug also fits about the bushing stem 12 and it is formed in its side walls with openings 18 to register with the openings 15 of the stem for outflow of water. Also, the plug has a closed upper end and a projecting wrench head flange 19 that engages against the mounting end of the spout. Packing, as at 20 and 20' is placed about the plug between the top and bottom edges of the spout to prevent leakage.

Slidably fitted within the bushing sleeve 9 and adapted both for rotary and vertical adjustment therein, is a valve plug or piston 35. This is fixedly mounted upon the squared, lower end portion 36' of a valve stem 36; being held by a nut 37 that is threaded into the lower end of the stem and seated within a socket in the lower end of the valve piston.

Fitted about the round portion of the stem 36 is the base portion 38 of a bracket or support 39. This base portion has an annular, projecting flange 40 that is held between the upper end wall of plug 16 and the upper end edge of stem 12, and the flange is shouldered on its under surface, as at 41 in Figs. 1 and 6, for limited rotatative movement, as between the full line and dotted line limits of turning of the handle shown in Fig. 3. When the plug 16 is drawn down tight, it holds the bracket in place and extended up from the plug. The upper portion is offset to extend to one side of the upper end of the stem 36, and it is formed at that end with a horizontal recess 42 opening toward the stem.

Interposed between the upper end of the valve piston 35 an an encircling collar 43 of truncated conical form, formed about the valve stem 36, is a washer or gasket 45 having a conically tapered, upwardly facing top surface 45a adapted to engage a similarly tapered valve seat 46 formed within the upper end portion of the sleeve bushing 9 in the passage leading into the bushing stem 12. This gasket seats in a recess formed in the upper end of the valve piston and is clamped against the collar 41 by the tightening of the nut 37.

Formed in the side surfaces of the valve plug 35 and extending from the upper end thereof downwardly to a distance just above the level of ports 13 and 14, are channels 47 and 48. As observed best in Fig. 2, these channels have vertical side edges located diametrically opposite in the valve plug and their other side edges at the front side of the plug and spaced approximately 45° apart. The width of these channels is such that when one channel is in full registration with the corresponding port 13 or 14 for the hot or cold water connection, the other channel will be just out of registration with its corresponding port. Therefore, it is possible by rotative adjustment of the valve plug to one or the other of its opposite limits, to admit either all cold or all hot water to the spout, or by an adjustment to the intermediate position, for example, from the position shown in Fig. 3 or Fig. 4 to the position shown in Fig. 2, to admit cold and hot water in equal amounts. Furthermore, it is understood that by a rotative adjustment of the valve 35 from the position of Fig. 2 toward either of its opposite limits, as in Fig. 3 or in Fig. 4, to admit both hot and cold water in varying proportionate amounts depending upon the extent or degree of the adjustment.

The opening of the valve for the delivery of water is accomplished by depressing the valve plug from the closed position of Fig. 1 to the open position of Fig. 6, it being understood that with the valve in position of Fig. 1, no water will be permitted to escape to the swing spout regardless of the position of the valve with reference to its limits of rotary adjustment. This is by reason of the fact that the sealing gasket 45 is seated against the seat 46, and also the channels 47 and 48 are at that time located above the top edges of the ports 13 and 14 as shown in Fig. 1. In order for water to be discharged from the faucet, it is necessary to shift the valve piston downward so that one of the channels 47 or 48, or both of them, will be brought into registration with one or the other, or with both of the ports 13 and 14. The downward shifting of the valve piston, as well as its rotary adjustment, is accomplished through the mediacy of a handle lever 50. This lever as shown in Figs. 1, 5 and 7 has a longitudinal channel 50' vertically therethrough which receives the upper end of the stem 36 therein. This handle lever is mounted on the stem by a horizontal pivot pin 55 extended between and fixed in the side walls 51—51 of the channel and which pin is slidably and pivotally contained in the horizontal inwardly opening recess 42 formed in the upper end portion of the support or bracket 39.

The upper end portion of the stem 36 projects into the longitudinal channel 50' of the handle member and fixed thereon by a set screw 62 is a horizontal, pivot member shaft 63 which, at its ends, is rotatably fitted in openings in the opposite side walls 51—51 of channel. This pivot shaft 63 may be located mid-way of the ends of the handle lever, as seen in Fig. 1, or it may be as in Fig. 6.

It will be understood that with the handle lever thus attached, it may be depressed, for example, from the dotted line position in Fig. 6 to the full line position, thus to actuate the valve stem 36 downwardly to move the valve plug 35 from closed to an open position. Also, the handle affords the means for rotative adjustment of the valve piston through the required arc for obtaining any desired mixture of hot and cold water, or for the delivery of all cold or all hot water; this being limited by the depending flange 41 on the base of bracket 39 engaging shoulders 12x.

In order that the pressure of the water in the system may not operate to force the valve from its open to the closed position, I have provided a longitudinal groove 65 extending along the side of the valve piston 35 opening to the upper and lower ends thereof. Thus, as soon as the valve is moved to open position, and the water starts to flow, it will be admitted through this channel to the lower end of the plug as well as to the upper end, and thus the tendency to close the valve will be overcome to a great extent. Due to the side pressure of water on the valve piston, and the equalization of end pressures provided through the slot 65, the valve will remain at any position to which it may be depressed or turned, provided that the handle connections are properly balanced.

As a means of holding the valve closed by pressure of water in the system, I have extended a very narrow slot 70 from the bottom edge of the opening 13 in the bushing 9. This is of such an exact length that when the valve piston is in its closed position, as in Fig. 1, its lower end is just exposed below the end of the piston so that water under pressure will fill the lower end of the piston chamber and act on the piston to hold it tightly closed against the valve seat. Upon the initial opening action of the piston, the slit 70 will be covered and the water trapped under pressure will be allowed to escape through the channel 65.

The modified structure of Fig. 10 is designed for use where a swing spout is not required. In this construction, in lieu of the swing spout, the housing has a threaded nipple to which a pipe or other device may be connected. The nipple passage 73 communicates with the outlets of the stem 12 through the outlets 18 of the plug. The interior valve structure is like that already described and illustrated in Figs. 1 and 6.

In Figs. 11, 12 and 13, I have illustrated details of faucets that are equipped with means whereby the valve piston will be brought back to closed position when opening pressure on the handle lever is relieved. In the device of Fig. 11, a perforated disk 80 is fixed on the valve stem 65 in the passage of the bushing stem below the outlets 15. This water pressure will act against the disk to lift the valve to a closed position. In Figure 12 I have shown a coiled spring 85 located in the passage of stem 12 acting upwardly against a ring 86 that seats against a pin 87 through the stem, to urge the valve toward a closed position.

Likewise in Fig. 13, there is shown means for a timed or retarded closing action of the valve under the force of water pressure flowing through the valve passage. In this device a perforated disk 80 is fixed on the stem 36 below the openings 15 and another disk 90 is fixed on the stem above the openings 15 at a position that, on closing action of the valve it will trap water in the upper end of the stem chamber. This trapped water is then allowed to be discharged through a lateral port 91 and the rate of discharge may be regulated by the adjustment of a valve screw 92 threaded into the bore 91.

It is desirable in the use of valves of this kind to insure against any possible cross flow of water from hot to cold side or vice versa. Therefore I have provided one way check valves 99 of the disk type shown in Fig. 14 to be inserted in the pipe connections with the outer ends of the pipes 2 and 3 as indicated in Fig. 5. Such check valves open automatically under the pressure of water to admit flow to the valve whenever it is opened, but there can be no back flow therethrough. Other types of back-check valves might be used for this purpose.

Having thus described my invention, what I claim as new therein and desire to secure by Letters-Patent is:

1. A faucet comprising a housing enclosing a cylindrical chamber having a plurality of circumferentially spaced side wall inlets, a tubular stem extending from the housing co-axially of the chamber and opening into the chamber and formed with a valve seat therein, a valve piston fitted in the chamber for rotary and axial movement, a valve member at one end of the piston adapted to close against the said seat; said piston having flow channels in the side surfaces thereof corresponding to the said inlets and opening to the end of the piston at the outside of the valve member and adapted by rotative movement of the piston to be selectively registered with the inlets and a spout for the faucet mounted on said stem and communicating therewith.

2. A faucet as recited in claim 1 wherein the valve piston has an actuating stem extending therefrom coaxial of the tubular stem of the housing and beyond the end thereof and a handle for the valve actuating stem.

3. A mixing faucet comprising a housing formed with a chamber, open at one end and having a water inlet into the chamber, a bushing fitted in the chamber and formed with a valve chamber in open communication with the water inlet of the housing chamber, a tubular stem on the bushing extending from the open end of the housing chamber and opening into the valve chamber and formed about the opening with a valve seat and with lateral outlets beyond the seat a tubular plug applied to the open end of the housing chamber about the stem and having lateral outlets communicating with the stem outlets, a spout mounted about the plug body and a valve member in the valve chamber movable from and against the valve seat.

4. A mixing faucet as recited in claim 3 wherein said valve member is equipped with an actuating stem extending through the tubular stem and plug and is eqipped at its outer end with a handle.

5. A mixing faucet comprising a housing formed with a chamber, open at one end and having water inlets, a bushing fitted in the housing chamber and formed with a valve chamber with openings registering with the water inlets of the housing chamber, a tubular stem of reduced diameter extending from and coaxially of the bushing, opening into the valve chamber and having a valve seat about the opening and having lateral outlets beyond the seat, a tubular plug applied about the stem and threaded into the housing chamber and retaining the bushing seated and having openings communicating with the stem outlets, a spout mounted on the plug to swing thereon and communicating with the stem through the plug and stem outlets, a valve in the chamber and a stem for actuating the valve extending through the stem and plug.

6. A mixing faucet comprising a housing formed with a chamber, open at one end, and having hot and cold water inlets at opposite sides respectively, a bushing secured in the housing chamber and formed with a cylindrical valve chamber having inlet ports in opposite sides communicating with the hot and cold water inlets, a tubular stem extending from and coaxial of the bushing, said tubular stem opening into the chamber and being formed about the opening with a valve seat and having lateral outlets therefrom beyond the seat, a spout mounted about the bushing stem and communicating therewith through the said lateral outlets, a valve piston rotatably and slidably fitted in the valve chamber, a valve member on the piston and engageable against the valve seat to close the outlet; said piston overlapping the inlet ports and formed with flow channels in its opposite side surfaces corresponding to the said ports, a piston stem extending through the bushing stem and means connected with the piston stem for rotatably adjusting the piston for the selective registration of its flow channels with the inlet ports and for longitudinal shifting of the piston to open or close the valve.

7. A mixing faucet as recited in claim 6 wherein the spout is rotatably adjustable about the bushing stem.

8. A faucet as recited in claim 6 wherein means is provided for limiting the rotative adjustment of the valve piston in opposite directions for the selective registration of the flow channels individually with the hot and cold water inlets.

9. A faucet as recited in claim 6 wherein the said means last mentioned therein comprises arcuately spaced shoulders on the upper end of the tubular stem, and a member rotatable with the valve piston stem and through which the piston stem is longitudinally movable and equipped with a shoulder to engage with the said arcuately spaced shoulders to limit the turning arc of the valve piston.

10. A mixing faucet comprising a housing formed with a chamber open at one end and having hot and cold water inlets at opposite sides respectively, a bushing secured in the housing chamber and formed with a cylindrical valve chamber having inlet ports in its opposite side walls communicating with the hot and cold water inlets, a tubular stem extending from and coaxially of the bushing and formed with arcuately spaced shoulders at its upper end; said tubular stem opening into the chamber and being formed about the opening with a valve seat and with lateral outlets beyond the seat, a plug applied about the bushing and threaded into the housing chamber to retain the bushing seated and having lateral outlets registering with the stem outlets, a swing spout mounted about the plug and communicating with the stem through the plug and stem outlets, a bracket extended through the plug and having a base portion held between the upper end of the stem and the end wall of the plug for rotation axially of the plug; said base portion having shoulders to engage the shoulders of the stem to limit its rotative movement, a valve piston rotatably and slidably movable in the valve chamber having flow channels in side surfaces thereof corresponding to the hot and cold water inlets and opening to the end of the piston outside the valve member, a valve member on the piston engageable against the said seat, a handle lever pivotally mounted by the bracket, and a stem for the valve piston extended coaxially of the bushing stem and through the plug and having pivotal connection with the handle lever for longitudinal action of the valve piston and for rotatable adjustment to selectively register the flow channels with the inlets.

11. A faucet comprising a housing formed with a cylindrical chamber having opposite side wall inlets, a discharge spout on the housing and a passage to the spout from the chamber formed with a valve seat therein, a valve piston fitted in the chamber for rotary and endwise adjustment, a valve member on the piston movable therewith to close against said seat; said piston having flow channels in the side surfaces thereof corresponding to the said inlets and opening to the end of the piston at the outside of the valve member and terminating at their closed ends above the level of the side wall inlets when the valve member is closed against the seat, and adapted by rotative adjustment of the piston and movement thereof to open the valve to be selectively registered with their respective inlets, and there being a slit in the chamber wall leading from one of the inlets into the chamber just below the level of the piston when the valve is closed.

12. A faucet comprising a housing formed with cylindrical chamber having side wall inlets for water under pressure, and closed at one end and its other end formed with a central outlet and a valve seat about the outlet, a valve piston fitted in the chamber for endwise and rotative movement, a valve member on the piston adapted to close against the seat; said piston having flow channels in its side surfaces corresponding to the side wall inlets opening to the end of the piston at the outside of the valve member and terminating at their other ends above the level of the side wall inlets when the valve member is seated, and there being a channel from end to end of the piston at the outside of the valve member, and a valve piston actuating member whereby it may be rotatably adjusted and moved to an open position to selectively register the flow channels with the side wall inlets, and there being a slit in the chamber wall from one of the side wall openings toward the closed end of the chamber and terminating at a point that is just below the end of the piston when the valve member is seated to admit holding water pressure to the lower end of the valve chamber.

13. In a mixing faucet, a valve housing formed with a cylindrical chamber having circumferentially spaced inlets and having an outlet at one end forming a valve seat, a valve piston fitted in the chamber for rotary and endwise movement, a valve member on the end of the piston for closing against the seat, a piston stem for moving the valve piston to unseat the valve member and for rotating the piston, flow channels in the side surfaces of the piston open to the end thereof at the outside of the valve member and adapted by rotative movement of the piston to be registered respectively with the spaced inlets of the chamber upon opening of the valve, a handle support on the housing, a handle pivoted on the support and having a pivotal connection with the piston stem for endwise and rotative adjustment of the piston valve.

14. A mixing faucet as recited in claim 13 wherein the said handle support is rotatable with the stem and handle and means is provided for limiting the extent of rotation for registering the flow channels respectively with the chamber inlets.

ALFRED M. MOEN.